(12) United States Patent
Yoshinaga

(10) Patent No.: US 10,751,682 B2
(45) Date of Patent: Aug. 25, 2020

(54) METHOD AND APPARATUS FOR MANUFACTURING EXCREMENT TREATMENT MATERIAL

(71) Applicant: DAIKI CO., LTD., Tokyo (JP)

(72) Inventor: Junji Yoshinaga, Tokyo (JP)

(73) Assignee: DAIKI CO., LTD., Tokyo (JP)

( * ) Notice: Subject to any disclaimer, the term of this patent is extended or adjusted under 35 U.S.C. 154(b) by 53 days.

(21) Appl. No.: 16/268,794

(22) Filed: Feb. 6, 2019

(65) Prior Publication Data

US 2019/0168180 A1 Jun. 6, 2019

Related U.S. Application Data

(63) Continuation of application No. PCT/JP2017/028196, filed on Aug. 3, 2017.

(30) Foreign Application Priority Data

Sep. 5, 2016 (JP) .................. 2016-172664

(51) Int. Cl.
| | |
|---|---|
| *B01J 2/20* | (2006.01) |
| *B30B 11/22* | (2006.01) |
| *A01K 1/015* | (2006.01) |
| *B01J 2/00* | (2006.01) |
| *B29C 48/00* | (2019.01) |
| *B29C 48/04* | (2019.01) |
| *B01J 20/28* | (2006.01) |

(Continued)

(52) U.S. Cl.
CPC ............... *B01J 2/20* (2013.01); *A01K 1/0152* (2013.01); *A01K 1/0154* (2013.01); *B01J 2/003* (2013.01); *B30B 11/227* (2013.01); *B30B 11/228* (2013.01); *A01K 1/0155* (2013.01); *B01J 20/28019* (2013.01); *B29B 9/06* (2013.01); *B29C 48/002* (2019.02); *B29C 48/04* (2019.02); *B29C 48/345* (2019.02)

(58) Field of Classification Search
None
See application file for complete search history.

(56) References Cited

U.S. PATENT DOCUMENTS

2005/0230872 A1* 10/2005 Scobee ................. B01J 2/20
264/141
2012/0119140 A1* 5/2012 Ito ..................... A01K 1/0155
252/194

(Continued)

FOREIGN PATENT DOCUMENTS

JP 2013-247920 A 12/2013

*Primary Examiner* — Mary Lynn F Theisen
(74) *Attorney, Agent, or Firm* — Oliff PLC

(57) ABSTRACT

The manufacturing method includes a granulation step. The granulation step is a step of forming a plurality of granules by performing extrusion granulation on a granulation material using a granulation machine. The granulation machine includes a die and a roller. A through hole that allows the granulation material to pass therethrough is formed in the die. The roller pushes the granulation material into the through hole while rolling on the surface of the die. In the granulation step, low-speed pushing in which the granulation material is pushed while the roller rolls at a first speed, and high-speed pushing in which the granulation material is pushed while the roller rolls at a second speed that is higher than the first speed are executed.

20 Claims, 14 Drawing Sheets

(51) Int. Cl.
  *B29B 9/06* (2006.01)
  *B29C 48/345* (2019.01)

(56) References Cited

U.S. PATENT DOCUMENTS

2015/0107524 A1* 4/2015 Hiroshima ........... A01K 1/0154
                                                    119/171
2015/0272078 A1* 10/2015 Ikegami ................ B30B 11/228
                                                    264/40.1
2016/0082416 A1* 3/2016 Mochizuki ........... A01K 1/0155
                                                    119/171

* cited by examiner

METHOD AND APPARATUS FOR MANUFACTURING EXCREMENT TREATMENT MATERIAL

CROSS REFERENCE TO RELATED APPLICATION

This is a Continuation of International Application No. PCT/JP2017/028196 filed Aug. 3, 2017, which claims the benefit of Japanese Application No. 2016-172664 filed Sep. 5, 2016. The contents of these applications are hereby incorporated by reference in their entirety.

TECHNICAL FIELD

The present invention relates to a method and an apparatus for manufacturing an excrement treatment material.

BACKGROUND ART

A conventional excrement treatment material is disclosed in, for example, Patent Document 1. The excrement treatment material is composed of a plurality of cylindrical grains. The plurality of grains include two types of grains that have different lengths. That is, grains (long grains) that have a length that is greater than their diameter, and grains (short grains) that have a length that is less than or equal to their diameter exist in a mixed manner.

CITATION LIST

Patent Document

Patent Document 1: JP 2013-247920A

SUMMARY OF INVENTION

Technical Problem

The excrement treatment material in which grains of different lengths exist in a mixed manner as described above is conventionally manufactured by separately forming relatively long grains and relatively short grains, and thereafter mixing the relatively long grains and the relatively short grains. However, executing the mixing step has been a factor that adds complexity to the process for manufacturing an excrement treatment material.

Solution to Problem

The present invention has been made in view of the problem described above, and it is an object of the present invention to provide a method and an apparatus for manufacturing an excrement treatment material, with which it is possible to obtain an excrement treatment material that contains grains of different lengths in a mixed manner, without executing a mixing step.

A method for manufacturing an excrement treatment material according to the present invention includes a granulation step of forming a plurality of granules by performing extrusion granulation on a granulation material using a granulation machine. The granulation machine includes: a die in which a through hole that allows the granulation material to pass therethrough is formed; and a roller that pushes the granulation material into the through hole while rolling on a surface of the die. In the granulation step, low-speed pushing in which the granulation material is pushed while the roller rolls at a first speed, and high-speed pushing in which the granulation material is pushed while the roller rolls at a second speed that is higher than the first speed are executed.

According to the manufacturing method, the low-speed pushing in which the granulation material is pushed while the roller rolls at a relatively low speed (the first speed), and the high-speed pushing in which the granulation material is pushed while the roller rolls at a relatively high speed (the second speed) are both executed in the granulation step. For this reason, relatively short granules are obtained through the low-speed pushing, and relatively long granules are obtained through the high-speed pushing. Accordingly, it is possible to obtain an excrement treatment material that contains grains of different lengths in a mixed manner, without executing a mixing step after the granulation step.

Also, an apparatus for manufacturing an excrement treatment material according to the present invention includes a granulation machine that forms a plurality of granules by performing extrusion granulation on a granulation material. The granulation machine includes: a die in which a through hole that allows the granulation material to pass therethrough is formed; and a roller that pushes the granulation material into the through hole while rolling on a surface of the die. The granulation machine executes low-speed pushing in which the granulation material is pushed while the roller rolls at a first speed, and high-speed pushing in which the granulation material is pushed while the roller rolls at a second speed that is higher than the first speed.

With the manufacturing apparatus, the low-speed pushing in which the granulation material is pushed while the roller rolls at a relatively low speed (the first speed), and the high-speed pushing in which the granulation material is pushed while the roller rolls at a relatively high speed (the second speed) are both executed by the granulation machine. For this reason, relatively short granules are obtained through the low-speed pushing, and relatively long granules are obtained through the high-speed pushing. Accordingly, it is possible to obtain an excrement treatment material that contains grains of different lengths in a mixed manner, without executing a mixing step after the granulation by the granulation machine.

Advantageous Effects of Invention

According to the present invention, it is possible to implement a method and an apparatus for manufacturing an excrement treatment material, with which it is possible to obtain an excrement treatment material that contains grains of different lengths in a mixed manner, without executing a mixing step.

DESCRIPTION OF EMBODIMENTS

Figure 1:
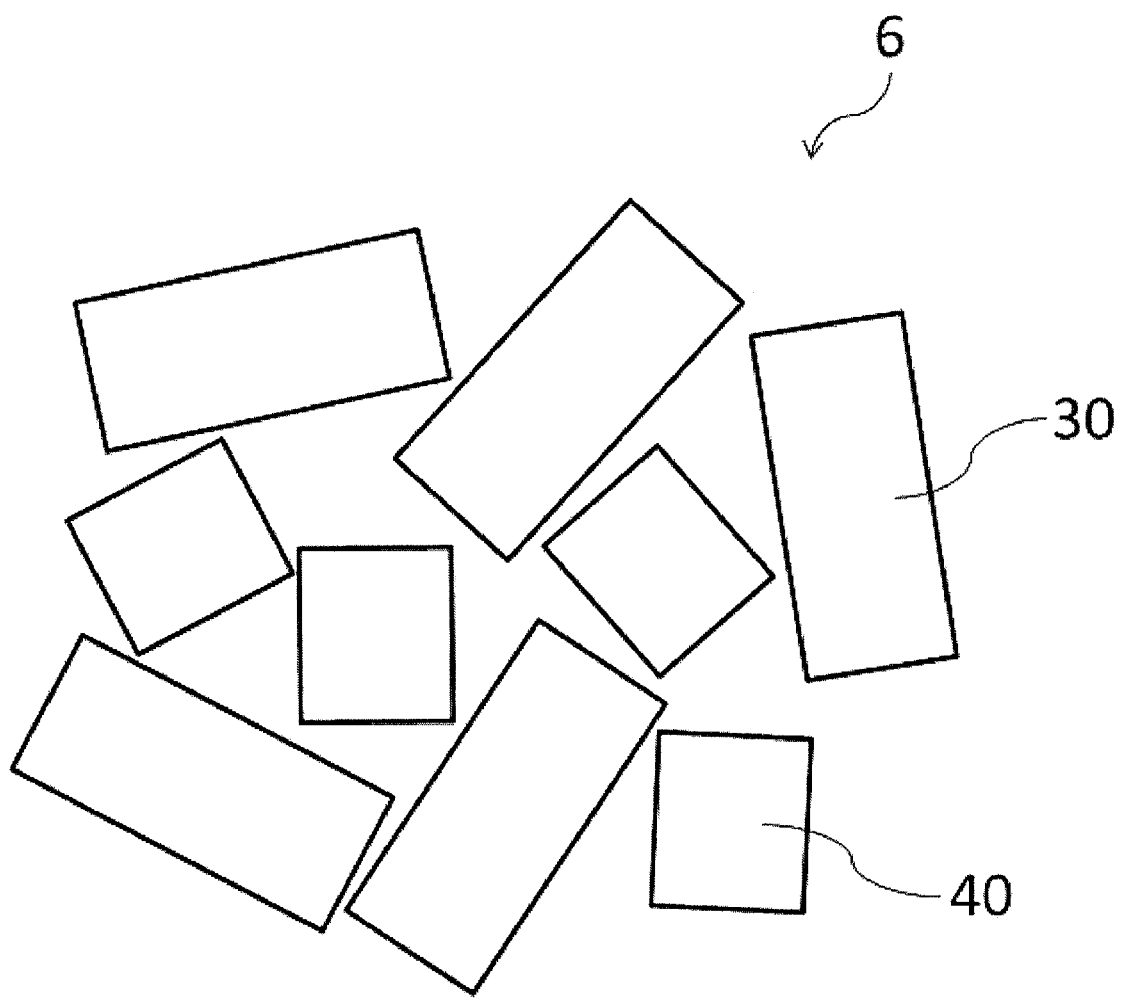
FIG. 1 is a schematic diagram of an excrement treatment material according to an embodiment of the present invention.

Hereinafter, an embodiment of the present invention will be described in detail with reference to the drawings. In the description of the drawings, the same elements are given the same reference numerals, and a redundant description will be omitted.

FIG. 1 is a schematic diagram showing an excrement treatment material according to an embodiment of the present invention. An excrement treatment material 6 is an excrement treatment material that is composed of a plurality of grains, and contains grains 30 and grains 40. The grains 30 and 40 have mutually different lengths. That is, the grains 30 are longer in length than the grains 40. In the excrement treatment material 6, grains 30 and 40 that have different lengths are present in a mixed manner. The diameter of the grains 30 and the diameter of the grains 40 are substantially equal. The excrement treatment material 6 is a material used in the disposal of excrement from an animal such as a cat by absorbing the excrement.

Figure 2:
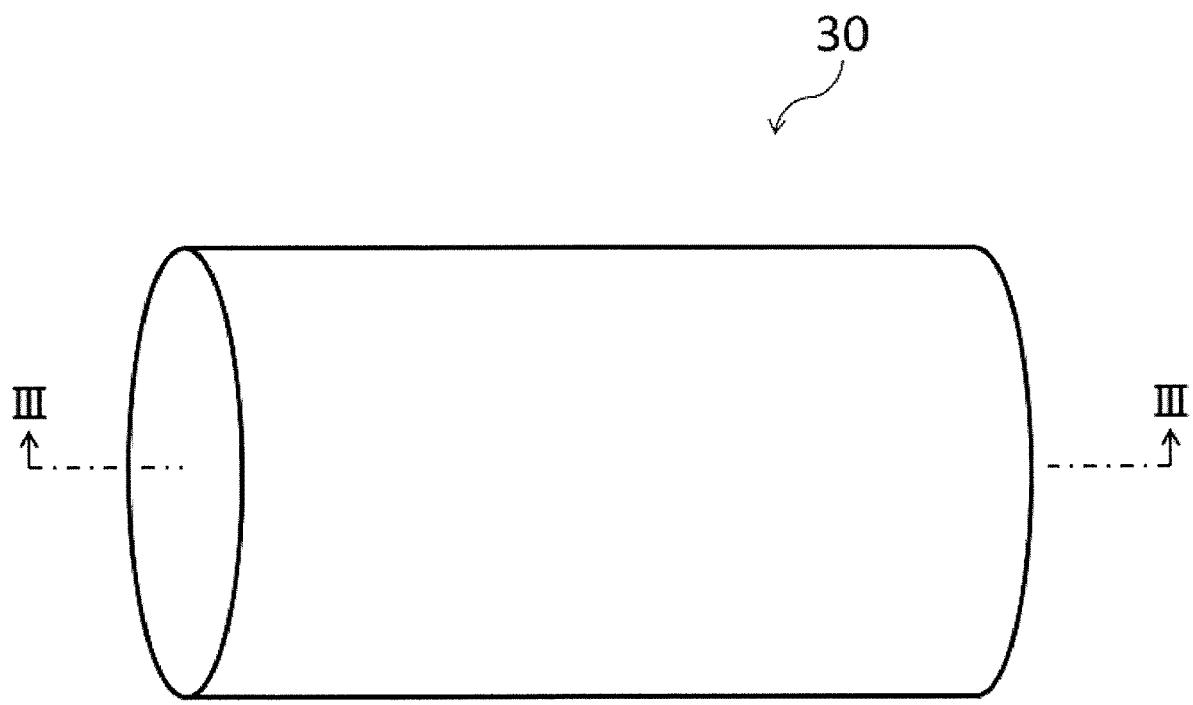
FIG. 2 is a perspective view of a grain 30 contained in the excrement treatment material shown in FIG. 1.
Figure 3:
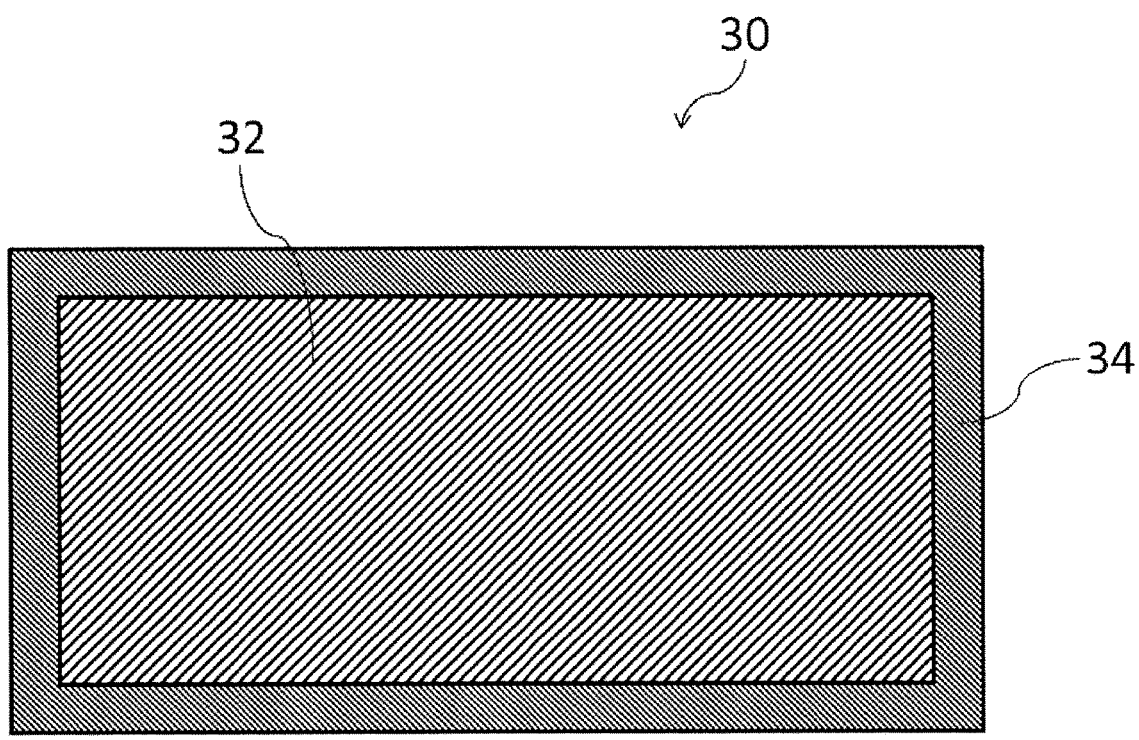
FIG. 3 is a cross-sectional view taken along the line III-III shown in FIG. 2.

FIG. 2 is a perspective view of a grain 30. FIG. 3 is a cross-sectional view taken along the line III-III shown in FIG. 2. The grain 30 has a substantially cylindrical shape. The grain 30 includes a core portion 32 (granule) and a coating portion 34. The core portion 32 is formed in a substantially cylindrical shape. The core portion 32 is a granule obtained through high-speed pushing performed by a granulation machine 10, which will be described later. It is preferable that the core portion 32 has a mean length value that is greater than the diameter of through holes 13, which will be described later. As used herein, the mean length value of the core portion 32 means the arithmetic mean length of a plurality of core portions 32. The core portion 32 has a function of absorbing and retaining excrement. The core portion 32 preferably contains an organic substance as the main material. As used herein, the main material of the core portion 32 refers to one of the materials constituting the core portion 32 that accounts for the highest proportion by weight in the core portion 32. Papers, used tea leaves, plastics, or soybean refuse, for example, can be used as the organic substance.

Papers refer to a material composed mainly of pulp. Examples of papers include ordinary paper, a vinyl chloride wallpaper classified product (paper obtained by classifying vinyl chloride wallpaper), a fluff pulp, papermaking sludge, pulp sludge, and the like. A disposable diaper classified product (plastic obtained by classifying disposable diapers), for example, can be used as the plastics. The soybean refuse is preferably dried soybean refuse.

The coating portion 34 covers the core portion 32. The coating portion 34 may cover the entire surface of the core portion 32, or may cover only a portion of the surface of the core portion 32. The coating portion 34 has a function of bonding grains 30 and 40 that have absorbed excrement while in use, and clumping them together. The coating portion 34 also preferably contains an organic substance as the main material.

The coating portion 34 contains an adhesive material. As the adhesive material, it is possible to use, for example, starch, CMC (carboxymethyl cellulose), PVA (polyvinyl alcohol), dextrin, or a water absorbent polymer.

Figure 4:
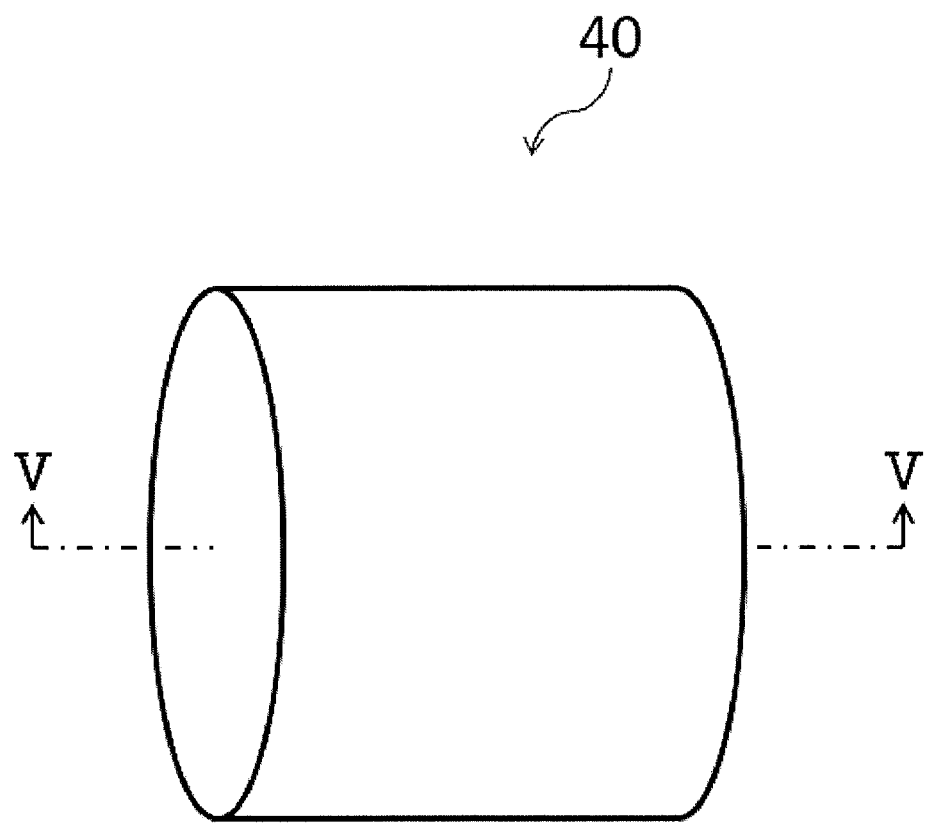
FIG. 4 is a perspective view of a grain 40 contained in the excrement treatment material shown in FIG. 1.
Figure 5:
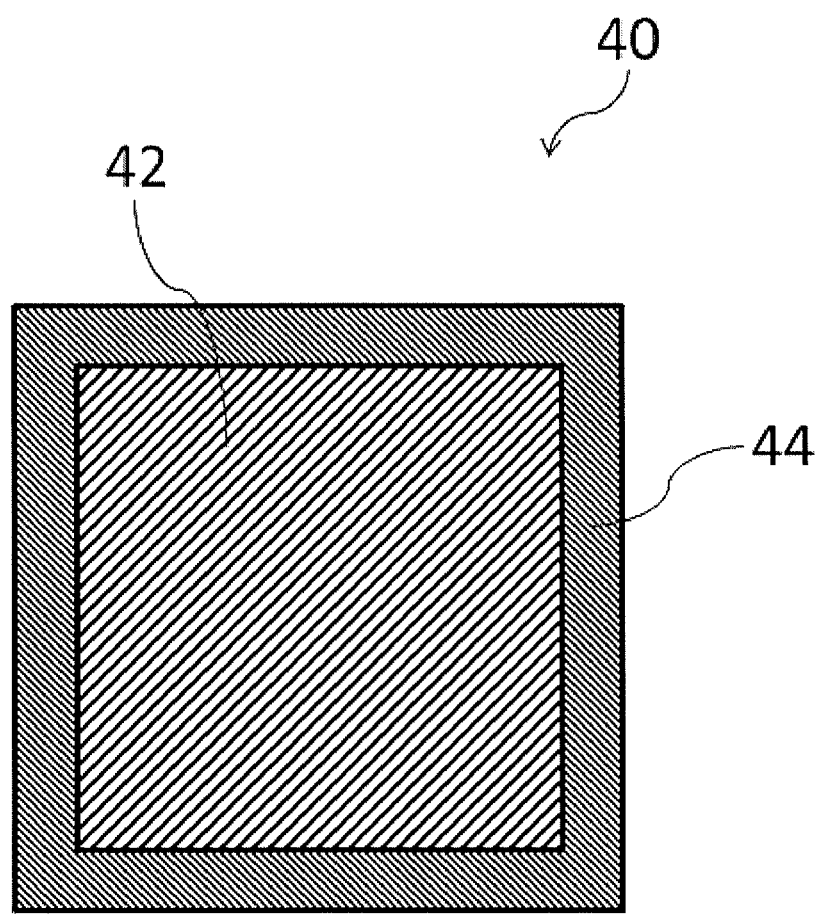
FIG. 5 is a cross-sectional view taken along the line V-V shown in FIG. 4.

FIG. 4 is a perspective view of a grain 40. FIG. 5 is a cross-sectional view taken along the line V-V shown in FIG. 4. The grain 40 has a substantially cylindrical shape. The grain 40 includes a core portion 42 (granule) and a coating portion 44. The core portion 42 is formed in a substantially cylindrical shape. The core portion 42 is a granule obtained through low-speed pushing performed by the granulation machine 10, which will be described later. It is preferable that the core portion 42 has a mean length value that is less than or equal to the diameter of the through holes 13, which will be described later. Here, the definition of the mean length value of the core portion 42 is the same as the definition of the mean length value of the core portion 32 described above. The mean length value of the core portion 42 is smaller than the mean length value of the core portion 32. The mean length value of the core portion 32 is preferably two times or more the mean length value of the core portion 42. The diameter of the core portion 32 and the diameter of the core portion 42 are substantially equal. The core portion 42 has a function of absorbing and retaining excrement. The core portion 42 is made of the same material as the material of the core portion 32.

The coating portion 44 covers the core portion 42. The coating portion 44 may cover the entire surface of the core portion 42, or may cover only a portion of the surface of the core portion 42. The coating portion 44 has a function of bonding grains 30 and 40 that have absorbed excrement while in use, and clumping them together. The coating portion 44 is made of the same material as the material of the coating portion 34.

Figure 6:
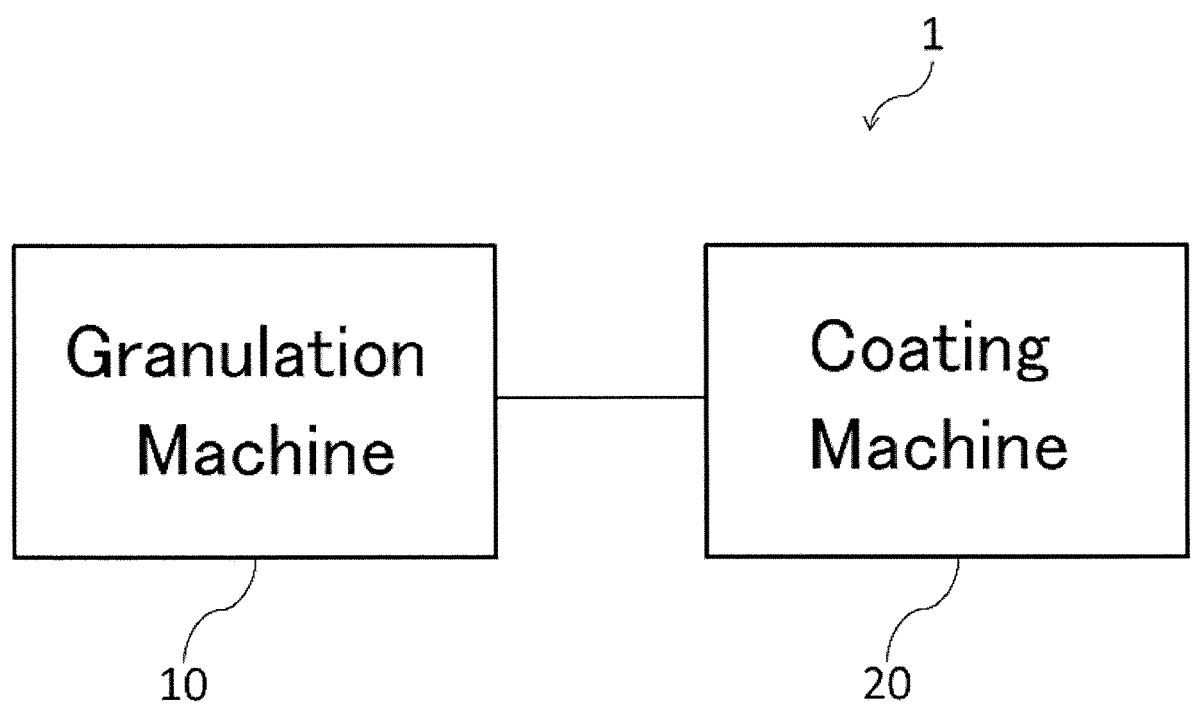
FIG. 6 is a configuration diagram of an apparatus for manufacturing an excrement treatment material according to an embodiment of the present invention.

FIG. 6 is a configuration diagram of an apparatus for manufacturing an excrement treatment material according to an embodiment of the present invention. A manufacturing apparatus 1 is an apparatus for manufacturing the above-described excrement treatment material 6. The manufacturing apparatus 1 includes a granulation machine 10 and a coating machine 20.

Figure 7:
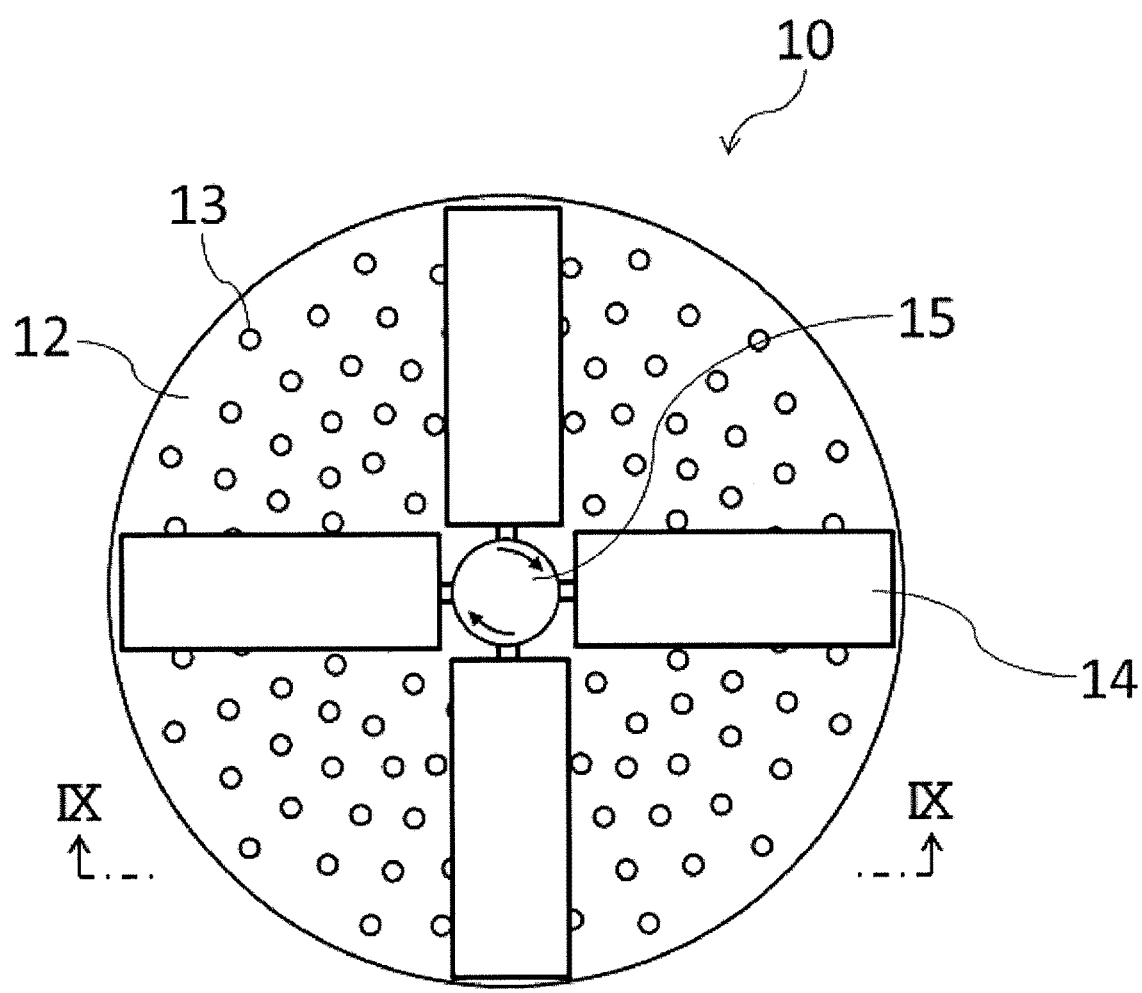
FIG. 7 is a plan view of a granulation machine 10 included in the manufacturing apparatus shown in FIG. 6.
Figure 8:
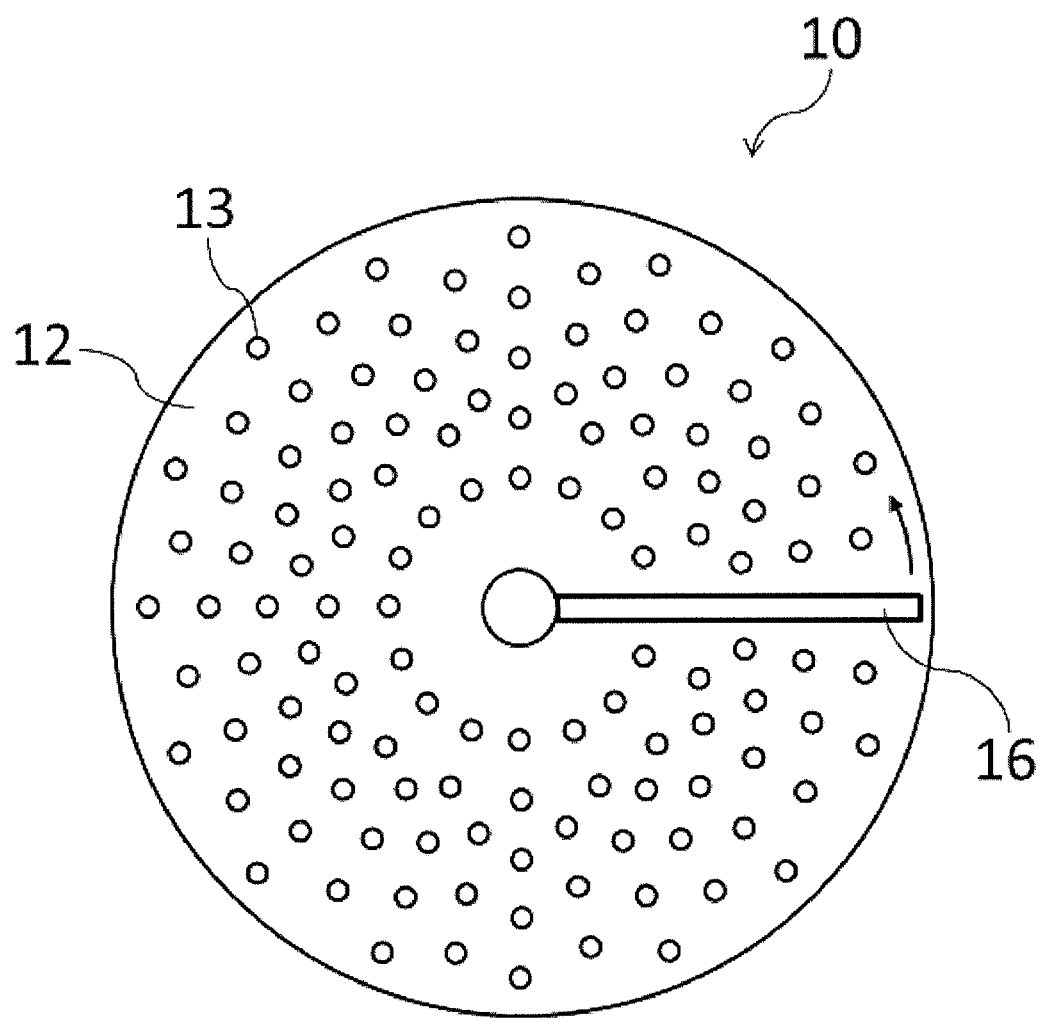
FIG. 8 is a bottom view of the granulation machine 10 included in the manufacturing apparatus shown in FIG. 6.
Figure 9:
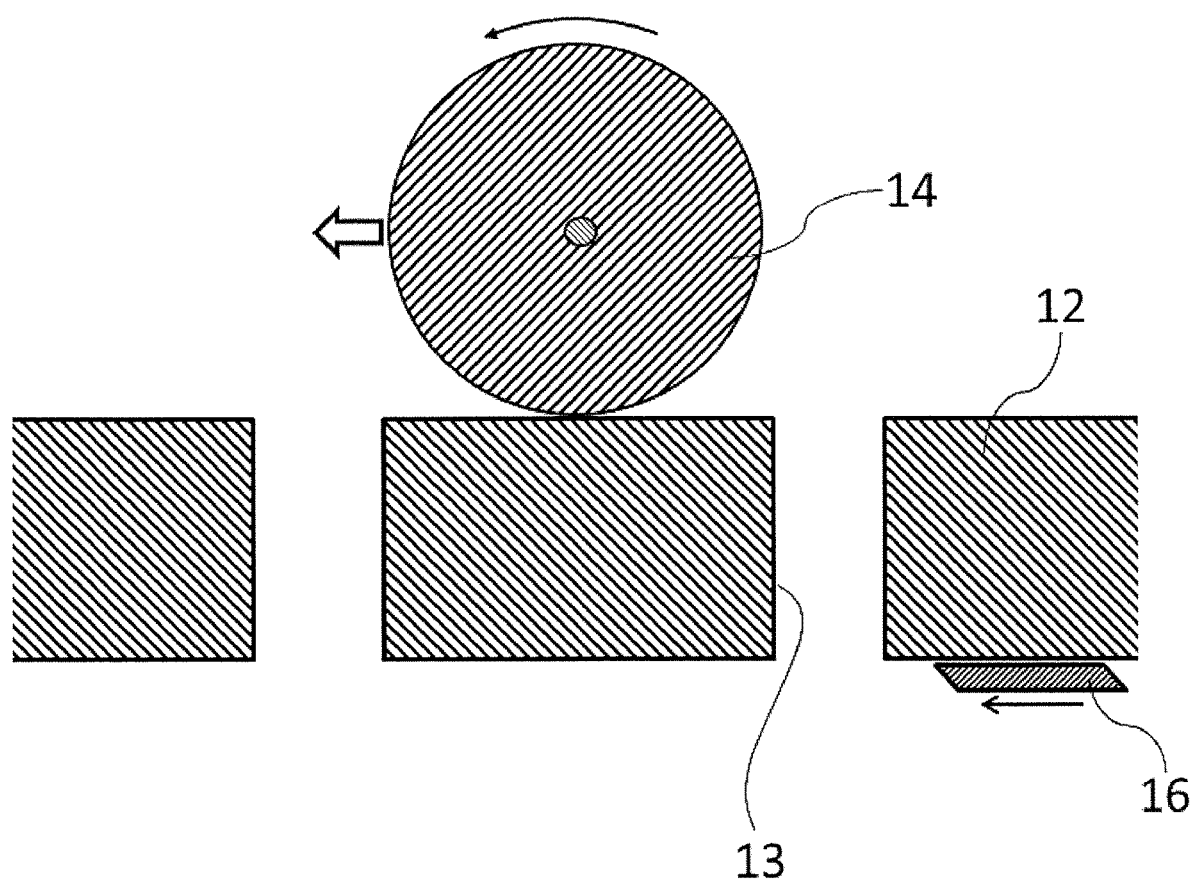
FIG. 9 is a diagram showing a part of the end face along the line IX-IX shown in FIG. 7.

FIGS. 7 and 8 are respectively a plan view and a bottom view of the granulation machine 10. Also, FIG. 9 is a diagram showing a part of the end face along the line IX-IX shown in FIG. 7. The granulation machine 10 is an extrusion granulation machine that forms a plurality of granules (core portions 32 and 42) by performing extrusion granulation on a granulation material (a material for forming the core portions 32 and 42). The granulation machine 10 includes a die 12, a roller 14 and a cutter 16. A plurality of through holes 13 that allow the granulation material to pass therethrough are formed in the die 12. The through holes 13 are distributed substantially over the entire surface of the die 12.

As shown in FIG. 7, the roller 14 is provided on the front surface side of the die 12 (the side into which the granulation material enters). The roller 14 has a cylindrical shape, and its central axis extends in a radial direction of the die 12. In the present embodiment, a plurality of the rollers 14 (specifically four rollers 14) are provided. An end of each of the rollers 14 is connected to a rotation shaft 15 located at the center portion of the front surface of the die 12. The rollers 14 push the granulation material into the through holes 13 while rolling on the front surface of the die 12. Here, the rolling of the rollers 14 refers to the rollers 14 moving on the die 12 while rotating around their central axes. In the present embodiment, each of the rollers 14 rotates around its central axis, and revolves around the rotation shaft 15. The rollers 14 can pass over all of the through holes 13 formed in the die 12.

As shown in FIG. 8, the cutter 16 is provided on the back surface side of the die 12 (the side from which the granulation material is discharged). The cutter 16 extends in a radial direction of the die 12 from the center portion of the back surface of the die 12. The cutter 16 cuts the granulation material that has been extruded from the through holes 13 while rotating along the back side of the die 12. To be specific, the cutter 16 rotates about the center portion of the die 12 within a plane that is parallel to the back surface of the die 12. The cutter 16 is configured to be capable of rotating independently from the rollers 14 described above. The cutter 16 can pass over all of the through holes 13 formed in the die 12.

The granulation machine 10 is configured to execute low-speed pushing in which the granulation material is pushed while the roller 14 rolls at a first speed, and high-speed pushing in which the granulation material is pushed while the roller 14 rolls at a second speed. The second speed is higher than the first speed. It is preferable that the second speed is two times or more the first speed. In the present embodiment, the granulation machine 10 is configured to alternately execute the low-speed pushing and the high-speed pushing a plurality of times. It is preferable that the execution time for a single instance of each of the low-speed pushing and the high-speed pushing is 1 minute or less. That is, it is preferable that the low-speed pushing and the high-speed pushing are switched at a time interval of 1 minute or less.

Figure 10:
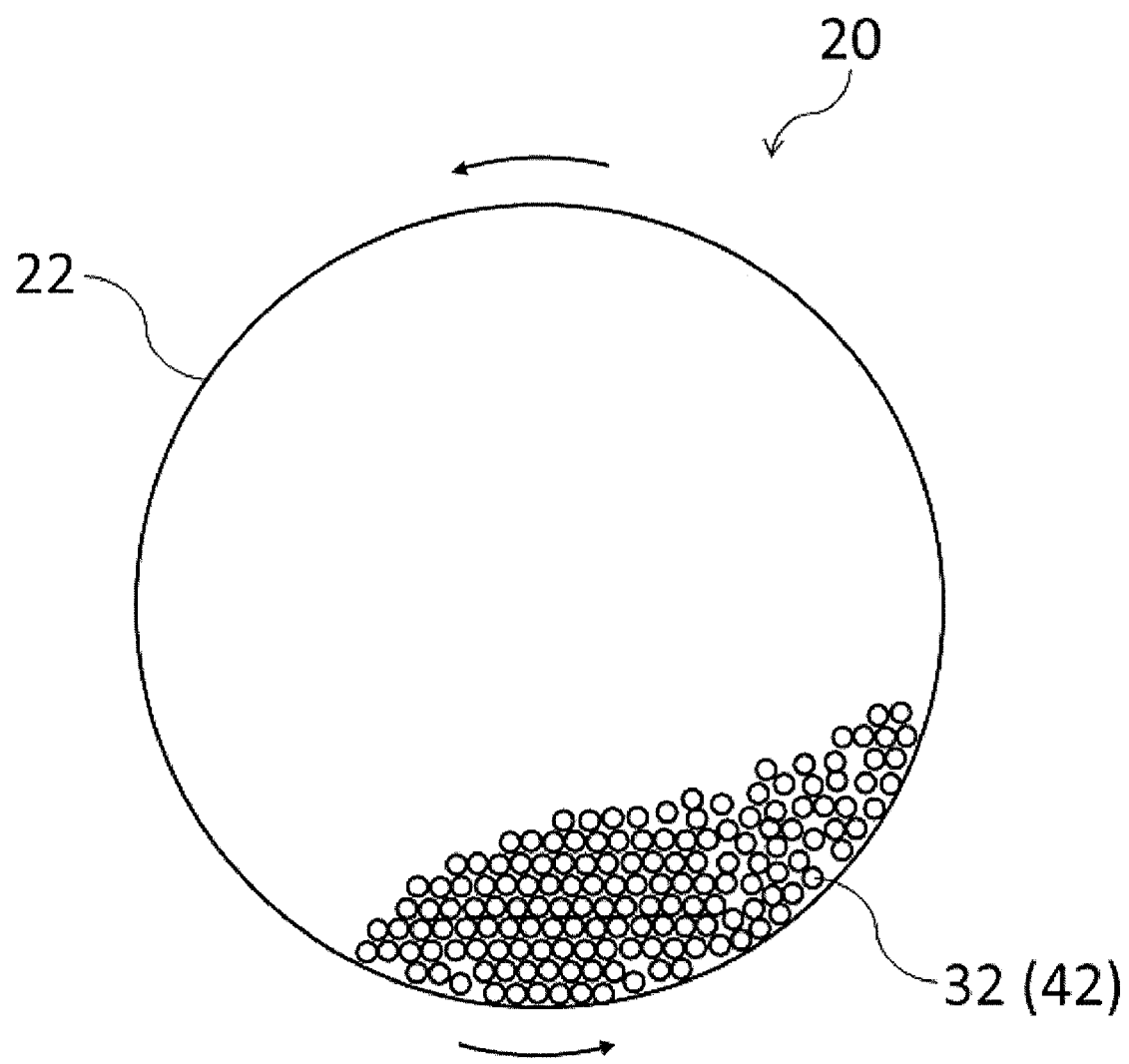
FIG. 10 is a diagram illustrating a structure of a coating machine 20 included in the manufacturing apparatus shown in FIG. 6.

Referring back to FIG. 6, the coating machine 20 is a machine for coating each of the granules (core portions 32 and 42) formed by the granulation machine 10 with a coating material (a material for forming the coating portions 34 and 44). As shown in FIG. 10, the coating machine 20 includes a drum 22 (container). The drum 22 has a substantially circular tube shape, and is provided so as to be capable of rotating. Specifically, the drum 22 is rotatable about its central axis. The central axis of the drum 22 is horizontal. A plurality of core portions 32 and 42 formed by the granulation machine 10 are housed in the drum 22. The coating machine 20 causes the coating material to be attached to the outer surface of each of the core portions 32 and 42 while rotating the drum 22 in which the core portions 32 and 42 are housed.

Next, a method for manufacturing an excrement treatment material according to an embodiment of the present invention will be described in conjunction with the operations of the manufacturing apparatus 1. The manufacturing method includes a granulation step and a coating step. The granulation step is a step of forming a plurality of core portions 32 and 42 by performing extrusion granulation on a granulation material using the granulation machine 10. Prior to granulation, the granulation material is subjected to pre-treatment such as pulverization, kneading, and adding water, as needed.

Figure 11:
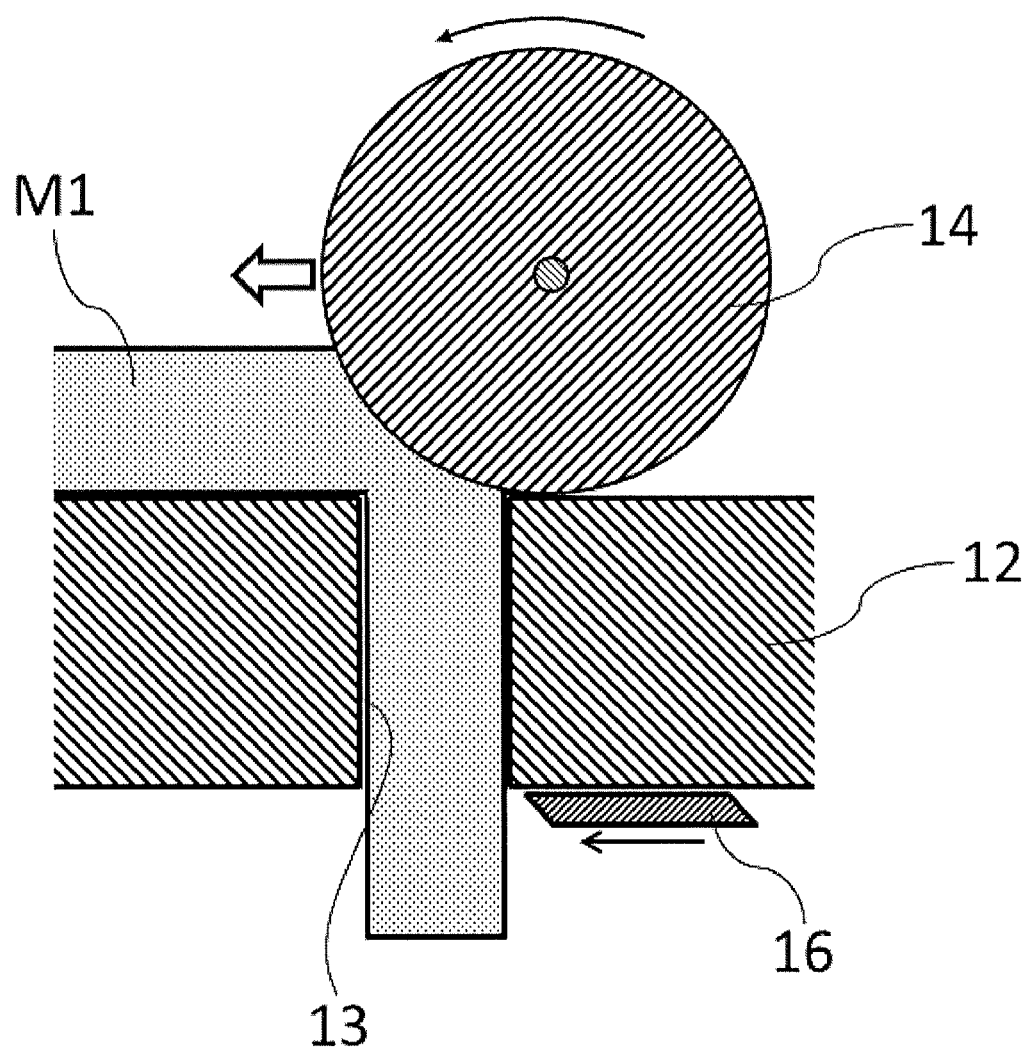
FIG. 11 is a diagram illustrating a granulation step of a method for manufacturing an excrement treatment material according to an embodiment of the present invention.
Figure 12:
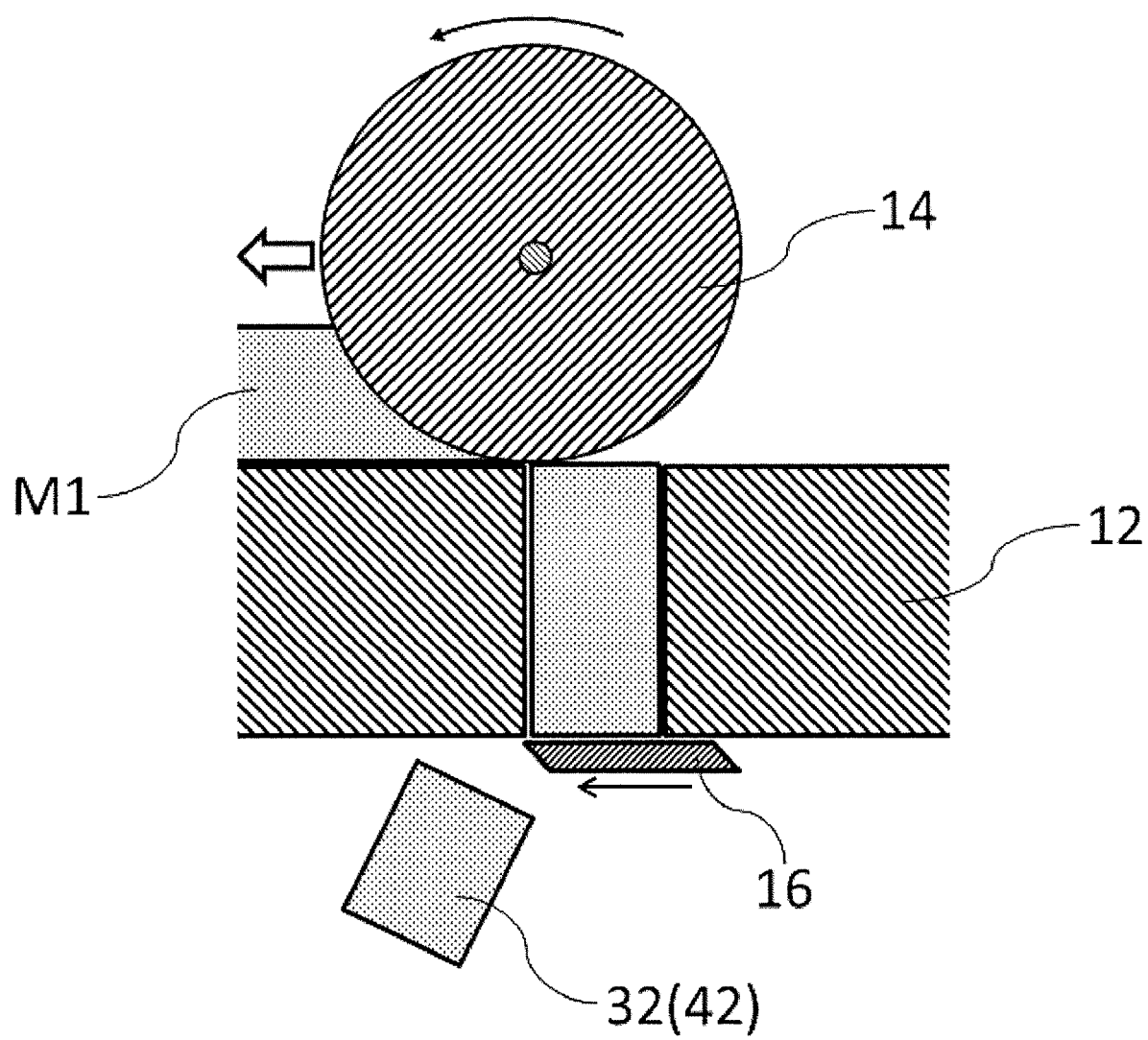
FIG. 12 is a diagram illustrating the granulation step of the method for manufacturing an excrement treatment material according to an embodiment of the present invention.

In the granulation step, as shown in FIG. 11, a granulation material M1 supplied on the front surface side of the die 12 is pushed into the through holes 13 by the rollers 14 rolling on the front surface of the die 12. The granulation material M1 pushed into the through holes 13 is extruded toward the back surface side of the die 12. On the back surface side of the die 12, the cutter 16 continuously rotates at a constant speed while the granulation material M1 is extruded. As a result, as shown in FIG. 12, the granulation material M1 that has been extruded from the through holes 13 is cut by the cutter 16. Cut portions obtained through the cutting in the manner described above are granules (core portions 32 and 42).

Figure 13:
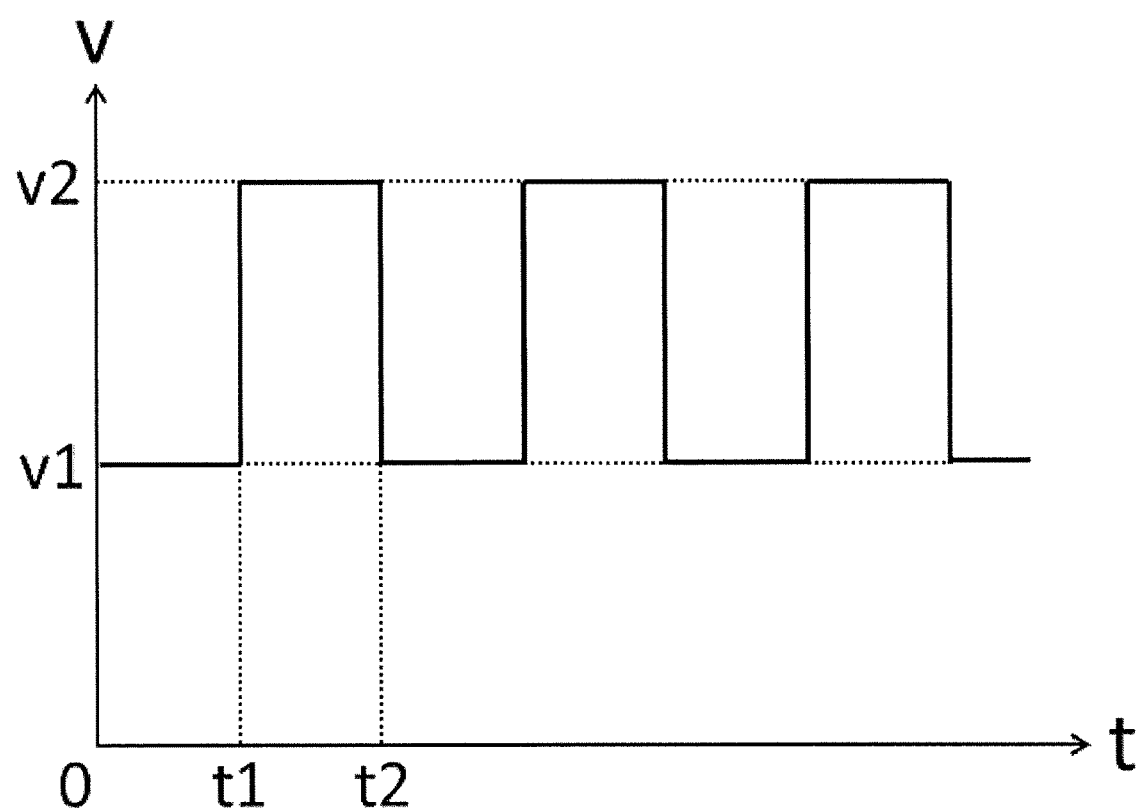
FIG. 13 is a graph showing an example of temporal changes in the rolling speed of the roller 14.

In the granulation step, the low-speed pushing and the high-speed pushing described above are executed. That is, the low-speed pushing and the high-speed pushing are both performed at least one time. In the present embodiment, as shown in FIG. 13, the low-speed pushing and the high-speed pushing are alternately executed a plurality of times. The diagram is a graph showing an example of temporal changes in the rolling speed of the roller 14. The rolling speed of the roller 14 is equal to the rotation number per unit time (rps) of the roller 14 around the rotation shaft 15.

The rolling speed of the roller 14 is maintained at v1 (the first speed) during a period from the start of operation of the granulation machine 10 (time 0) to time t1. That is, the low-speed pushing is performed during this period. At time t1, the pushing is switched from the low-speed pushing to the high-speed pushing. At this time, the rolling speed of the roller 14 is monotonously increased from v1 to v2 (the second speed). Accordingly, the rolling speed of the roller 14 is constantly within a range that is greater than or equal to v1 and less than or equal to v2 while the pushing is switched from the low-speed pushing to the high-speed pushing. In the graph, the time required for the switching is not taken into account.

During the period from time t1 to time t2, the rolling speed of the roller 14 is maintained at v2. That is, the high-speed pushing is performed during this period. At time t2, the pushing is switched from the high-speed pushing to the low-speed pushing. At this time, the rolling speed of the roller 14 is monotonously reduced from v2 to v1. Accordingly, the rolling speed of the roller 14 is also constantly within a range that is greater than or equal to v1 and less than or equal to v2 while the pushing switches from the high-speed pushing to the low-speed pushing. After that, switching between the low-speed pushing and the high-speed pushing is repeated in the same manner. Through this, a plurality of granules (core portions 32 and 42) are obtained.

The coating step is a step of coating each of the granules formed in the granulation step with a coating material. In the coating step, the core portions 32 and 42 formed in the granulation step are housed in the drum 22 (see FIG. 10), and thereafter the coating material is attached to the outer surface of each of the core portions 32 and 42 while rotating the drum 22. The coating material may be attached by, for example, sprinkling or spraying the coating material. In this way, coating portions 34 and 44 are formed. Then, post-treatment such as sieving and drying is performed as needed. Through the above processing, the excrement treatment material 6 that contains the grains 30 and the grains 40 in a mixed manner is obtained.

Advantageous effects of the present embodiment will be described. In the present embodiment, the low-speed pushing and the high-speed pushing are both performed during the granulation. In the high-speed pushing, the quantity of the granulation material extruded during one rotation of the cutter 16 is greater than that in the low-speed pushing. For this reason, relatively long granules (core portions 32) are obtained through the high-speed pushing, and relatively short granules (core portions 42) are obtained through the low-speed pushing. Accordingly, it is possible to obtain the excrement treatment material 6 that contains the grains 30 and 40 of different lengths in a mixed manner, without executing a mixing step after the granulation step.

The excrement treatment material 6 is used by being placed in an animal litter box. In the animal litter box, an animal such as a cat discharges excrement onto the excrement treatment material 6 while the animal is standing directly on the excrement treatment material 6. Accordingly, if gaps between grains that constitute the excrement treatment material 6 are large, the excrement treatment material 6 may significantly sink when an animal walks on it, and the animal may be unstable on its feet. To address this, in the excrement treatment material 6, in addition to the grains 30, the grains 40 that have a length that is smaller than the length of the grains 30 are provided. With this configuration, when the excrement treatment material 6 is placed in the animal litter box, the grains 40 enter the gaps between the grains 30. For this reason, a plurality of grains (grains 30 and 40) can be placed in the animal litter box at a higher density than when the configuration in which the excrement treatment material 6 is composed only of the grains 30 is used. Accordingly, with the excrement treatment material 6, it is possible to suppress sinking while the animal is on the excrement treatment material 6.

In order to make it easy for the grains 40 to enter the gaps between the grains 30, it is advantageous that the length of the grains 40 is sufficiently smaller than the length of the grains 30. From this viewpoint, the rolling speed of the roller 14 in the high-speed pushing (the second speed) is preferably two times or more the rolling speed of the roller 14 in the low-speed pushing (the first speed). Also, the granules (core portions 32) obtained through the high-speed pushing preferably have a mean length value that is two times or more the mean length value of the granules (core portions 42) obtained through the low-speed pushing.

The low-speed pushing and the high-speed pushing are alternately executed a plurality of times. In doing so, the core portions 32 and the core portions 42 are alternately obtained, and it is therefore possible to prevent the grains 30 (grains 40) from being excessively unevenly distributed in the manufactured excrement treatment material 6. From the viewpoint of suppressing the uneven distribution of the grains 30 (grains 40), it is preferable that the execution time for a single instance of each of the low-speed pushing and the high-speed pushing is 1 minute or less.

During the coating, the coating material is attached to the outer surface of each of the core portions 32 and 42 while rotating the drum 22 in which the core portions 32 and 42 are housed. By doing so, it is possible to uniformly attach the coating material to the entire outer surface of each of the core portions 32 and 42. Also, as a result of the drum 22 being rotated, the core portions 32 and 42 are agitated, and it is therefore possible to further suppress uneven distribution of the grains 30 (grains 40) in the manufactured excrement treatment material 6.

The present invention is not limited to the embodiment given above, and various modifications can be made. In the embodiment given above, an example has been described in which the rolling speed of the roller 14 is switched between two stages (at the first or second speed) during the granulation. However, the rolling speed of the roller 14 may be switched between three stages or more. For example, in the granulation step, in addition to the low-speed pushing and the high-speed pushing, intermediate-speed pushing in which the granulation material is pushed while the roller 14 rolls at a third speed may be executed by the granulation machine 10. The third speed is higher than the first speed and lower than the second speed. It is preferable that the third speed is 1.5 times or more the first speed. Also, the second speed is preferably 1.5 times or more the third speed.

Figure 14:
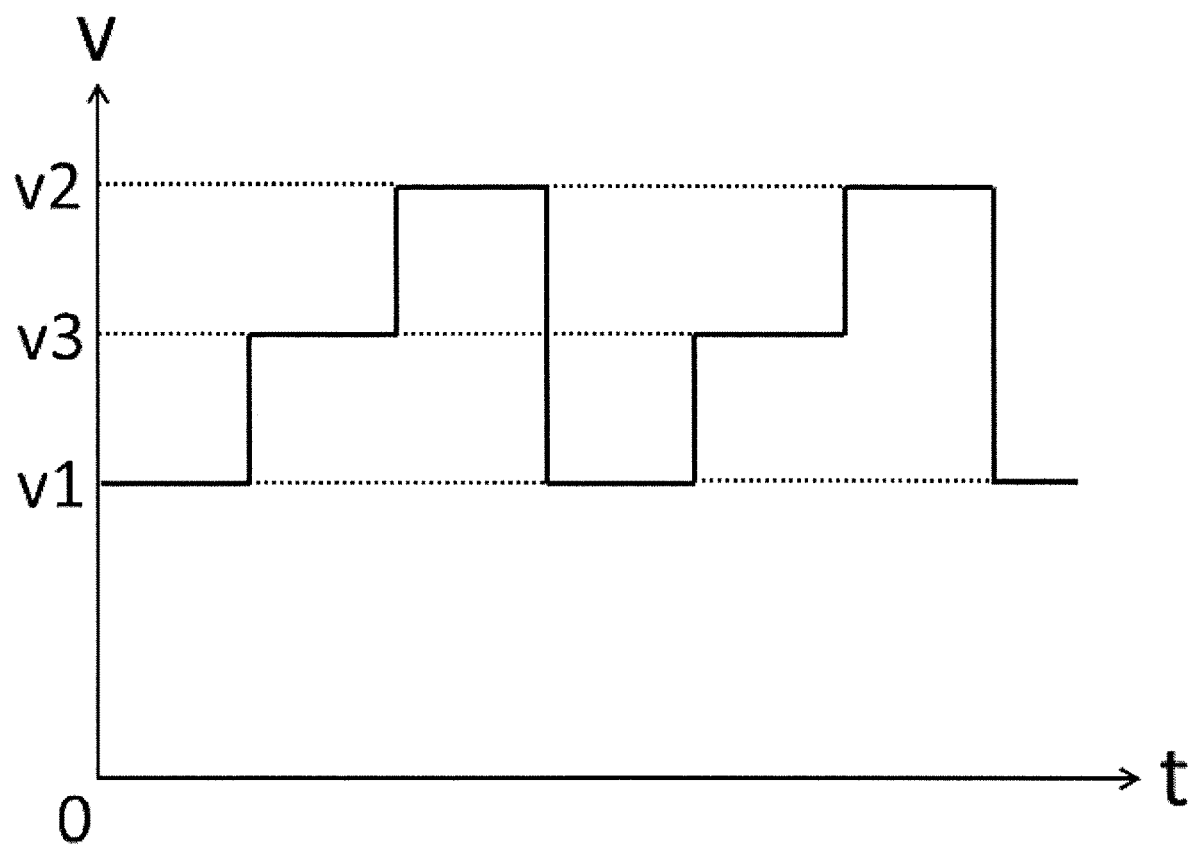
FIG. 14 is a graph showing another example of temporal changes in the rolling speed of the roller 14.

For example, as shown in FIG. 14, the low-speed pushing, the intermediate-speed pushing, and the high-speed pushing are executed in a predetermined order a plurality of times. The diagram is a graph showing an example of temporal changes in the rolling speed of the roller 14, which is similar to that shown in FIG. 13. The intermediate-speed pushing is executed while the rolling speed of the roller 14 is maintained at v3 (the third speed). It is preferable that the execution time for a single instance of each of the low-speed pushing, the intermediate-speed pushing, and the high-speed pushing is 1 minute or less. Even in the case where the intermediate-speed pushing is executed in addition to the low-speed pushing and the high-speed pushing as described above, if the low-speed pushing and the high-speed pushing are the focus, it can be said that the low-speed pushing and the high-speed pushing are "alternately executed a plurality of times".

The granules obtained through the intermediate-speed pushing have a mean length value that is smaller than the mean length value of the core portions 32 and is greater than the mean length value of the core portions 42. The granules obtained through the intermediate-speed pushing preferably have a mean length value that is 1.5 times or more the mean length value of the core portions 42. Also, the mean length value of the core portions 32 is preferably 1.5 times or more the mean length value of the granules obtained through the intermediate-speed pushing.

In the embodiment given above, an example has been described in which the granulation machine 10 is provided with the plurality of rollers 14. However, the granulation machine 10 may be provided with only one roller 14.

In the embodiment given above, an example has been described in which the roller 14 moves on the die 12 by rotational movement (around the rotation shaft 15). However, the roller 14 may move on the die 12 by linear movement.

In the embodiment given above, an example has been described in which each grain 30 has a multi-layer structure composed of the core portion 32 and the coating portion 34. However, there is no need to provide the coating portion 34. That is, each grain 30 may have a single-layer structure composed only of the core portion 32. The same applies to the grains 40. In this case, it is unnecessary to provide the coating machine 20, and the coating step is not executed.

In the embodiment given above, an example has been described in which the grains 30 and 40 are water-absorbent grains used in the disposal of excrement by absorbing the excrement. However, the grains 30 and 40 may be water-permeable grains that are used in the disposal of excrement by allowing the excrement to permeate therethrough. There are two types of water-permeable grains: grains that allow excrement to pass through the interior of the grains; and grains that allow excrement to pass through the gaps between the grains. An example of the latter grains is water-repellent grains.

LIST OF REFERENCE NUMERALS

1 Manufacturing Apparatus
6 Excrement Treatment Material
10 Granulation Machine
12 Die
13 Through Hole
14 Roller
15 Rotation Shaft
16 Cutter
20 Coating Machine
22 Drum (Container)
30 Grain
32 Core Portion (Granule)
34 Coating Portion
40 Grain
42 Core Portion (Granule)
44 Coating Portion

The invention claimed is:

1. A method for manufacturing an excrement treatment material comprising:
a granulation step of forming a plurality of granules by performing extrusion granulation on a granulation material using a granulation machine,
wherein the granulation machine includes: a die in which a through hole that allows the granulation material to pass therethrough is formed; and a roller that pushes the granulation material into the through hole while rolling on a surface of the die, and
in the granulation step, low-speed pushing in which the granulation material is pushed while the roller rolls at a first speed, and high-speed pushing in which the granulation material is pushed while the roller rolls at a second speed that is higher than the first speed are executed.

2. The method for manufacturing an excrement treatment material according to claim 1,
wherein the second speed is two times or more the first speed.

3. The method for manufacturing an excrement treatment material according to claim 1,
wherein, in the granulation step, the low-speed pushing and the high-speed pushing are alternately executed a plurality of times.

4. The method for manufacturing an excrement treatment material according to claim 3,
wherein an execution time for a single instance of each of the low-speed pushing and the high-speed pushing is 1 minute or less.

5. The method for manufacturing an excrement treatment material according to claim 1,
wherein the granules that are obtained through the high-speed pushing have a mean length value that is two times or more a mean length value of the granules that are obtained through the low-speed pushing.

6. The method for manufacturing an excrement treatment material according to claim 1,
wherein the granules that are obtained through the high-speed pushing have a mean length value that is greater than a diameter of the through hole, and
the granules that are obtained through the low-speed pushing have a mean length value that is less than or equal to the diameter of the through hole.

7. The method for manufacturing an excrement treatment material according to claim 1,
wherein, in the granulation step, intermediate-speed pushing in which the granulation material is pushed while the roller rolls at a third speed that is higher than the first speed and lower than the second speed is executed.

8. The method for manufacturing an excrement treatment material according to claim 7,
wherein the third speed is 1.5 times or more the first speed, and
the second speed is 1.5 times or more the third speed.

9. The method for manufacturing an excrement treatment material according to claim 7,
wherein, in the granulation step, the low-speed pushing, the intermediate-speed pushing, and the high-speed pushing are executed in a predetermined order a plurality of times.

10. The method for manufacturing an excrement treatment material according to claim 9,
wherein an execution time for a single instance of each of the low-speed pushing, the intermediate-speed pushing, and the high-speed pushing is 1 minute or less.

11. The method for manufacturing an excrement treatment material according to claim 7,
wherein the granules that are obtained through the intermediate-speed pushing have a mean length value that is 1.5 times or more a mean length value of the granules that are obtained through the low-speed pushing, and
the granules that are obtained through the high-speed pushing have a mean length value that is 1.5 times or more the mean length value of the granules that are obtained through the intermediate-speed pushing.

12. The method for manufacturing an excrement treatment material according to claim 1, comprising a coating step of coating each of the granules formed in the granulation step with a coating material.

13. The method for manufacturing an excrement treatment material according to claim 12,
wherein, in the coating step, the coating material is attached to an outer surface of each of the granules while rotating a container in which the plurality of granules formed in the granulation step are housed.

14. An apparatus for manufacturing an excrement treatment material comprising:
a granulation machine that forms a plurality of granules by performing extrusion granulation on a granulation material,
the granulation machine including: a die in which a through hole that allows the granulation material to pass therethrough is formed; and a roller that pushes the granulation material into the through hole while rolling on a surface of the die,
wherein the granulation machine executes low-speed pushing in which the granulation material is pushed while the roller rolls at a first speed, and high-speed pushing in which the granulation material is pushed while the roller rolls at a second speed that is higher than the first speed.

15. The apparatus for manufacturing an excrement treatment material according to claim 14,
wherein the granulation machine alternately executes the low-speed pushing and the high-speed pushing a plurality of times.

16. The apparatus for manufacturing an excrement treatment material according to claim 14,
wherein the granules that are obtained through the high-speed pushing have a mean length value that is greater than a diameter of the through hole, and
the granules that are obtained through the low-speed pushing have a mean length value that is less than or equal to the diameter of the through hole.

17. The apparatus for manufacturing an excrement treatment material according to claim 14,
  wherein the granulation machine executes intermediate-speed pushing in which the granulation material is pushed while the roller rolls at a third speed that is higher than the first speed and lower than the second speed.

18. The apparatus for manufacturing an excrement treatment material according to claim 17,
  wherein the granulation machine executes the low-speed pushing, the intermediate-speed pushing, and the high-speed pushing in a predetermined order a plurality of times.

19. The apparatus for manufacturing an excrement treatment material according to claim 14, comprising a coating machine that coats each of the granules formed by the granulation machine with a coating material.

20. The apparatus for manufacturing an excrement treatment material according to claim 19,
  wherein the coating machine includes a container that houses the plurality of granules formed by the granulation machine, and causes the coating material to be attached to an outer surface of each of the granules while rotating the container in which the plurality of granules are housed.

\* \* \* \* \*